United States Patent
Takagi et al.

(10) Patent No.: US 10,201,958 B2
(45) Date of Patent: Feb. 12, 2019

(54) APPARATUS FOR MANUFACTURING MEMBRANE ELECTRODE ASSEMBLY

(71) Applicant: SCREEN Holdings Co., Ltd., Kyoto (JP)

(72) Inventors: Yoshinori Takagi, Kyoto (JP); Masafumi Omori, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 0 days.

(21) Appl. No.: 15/430,678

(22) Filed: Feb. 13, 2017

(65) Prior Publication Data

US 2017/0239925 A1 Aug. 24, 2017

(30) Foreign Application Priority Data

Feb. 22, 2016 (JP) .................................. 2016-030818

(51) Int. Cl.
*B32B 37/00* (2006.01)
*H01M 8/1004* (2016.01)
(Continued)

(52) U.S. Cl.
CPC .......... *B32B 37/0053* (2013.01); *B32B 41/00* (2013.01); *H01M 8/1004* (2013.01);
(Continued)

(58) Field of Classification Search
CPC . B32B 37/0053; B32B 37/025; B32B 38/164; B32B 2457/18; B32B 41/00; H01M 8/1004; H01M 4/8882; B05C 9/14
(Continued)

(56) References Cited

U.S. PATENT DOCUMENTS

| 2006/0216563 A1* | 9/2006 | Matsunaga ......... | H01M 4/8626 |
| | | | 429/483 |
| 2007/0078051 A1* | 4/2007 | Tamai ................. | H01M 4/8642 |
| | | | 502/101 |

(Continued)

FOREIGN PATENT DOCUMENTS

| EP | 2 813 363 A1 | 12/2014 |
| EP | 3 050 703 A1 | 8/2016 |

(Continued)

OTHER PUBLICATIONS

Extended European Search Report dated Jul. 6, 2017 for corresponding European Patent Application No. 17154741.7.

*Primary Examiner* — Philip C Tucker
*Assistant Examiner* — John Blades
(74) *Attorney, Agent, or Firm* — Ostrolenk Faber LLP (57) ABSTRACT

An apparatus for manufacturing a membrane electrode assembly includes a suction roller, a porous base material supply roller, a porous base material collection roller, a laminated base material supply roller, an assembly collection roller, an application part disposed around the suction roller and a maintenance space for the maintenance of the application part. The porous base material supply roller and the porous base material collection roller are disposed on the opposite side of the suction roller from the maintenance space as seen in a horizontal direction. The porous base material supply roller and the porous base material collection roller are collectively disposed on one side of the suction roller. This configuration ensures the maintenance space on the opposite side of the suction roller, and lowers the height dimension of the manufacturing apparatus.

11 Claims, 5 Drawing Sheets

(51) Int. Cl.
*B32B 41/00* (2006.01)
*B32B 38/00* (2006.01)
*H01M 4/88* (2006.01)
*H01M 8/1018* (2016.01)
*B32B 37/20* (2006.01)
*B32B 37/24* (2006.01)
*B32B 38/10* (2006.01)
*B32B 38/18* (2006.01)

(52) U.S. Cl.
CPC ............... *B32B 37/20* (2013.01); *B32B 37/24* (2013.01); *B32B 38/10* (2013.01); *B32B 38/164* (2013.01); *B32B 38/1858* (2013.01); *B32B 2457/18* (2013.01); *H01M 4/8882* (2013.01); *H01M 2008/1095* (2013.01)

(58) Field of Classification Search
USPC .......................................... 156/390; 427/115
See application file for complete search history.

(56) References Cited

U.S. PATENT DOCUMENTS

| | | | | |
|---|---|---|---|---|
| 2007/0190253 | A1* | 8/2007 | Matsunaga | H01M 8/1004 427/282 |
| 2012/0003564 | A1* | 1/2012 | Adachi | C08J 5/2256 429/492 |
| 2013/0230641 | A1* | 9/2013 | Suzuki | H01M 4/0404 427/58 |
| 2014/0255607 | A1* | 9/2014 | Maki | B05C 5/0254 427/256 |

FOREIGN PATENT DOCUMENTS

| | | |
|---|---|---|
| JP | 2013-161557 | 8/2013 |
| JP | 2015-069739 A | 4/2015 |
| WO | WO 2015/122081 A1 | 8/2015 |

* cited by examiner

APPARATUS FOR MANUFACTURING MEMBRANE ELECTRODE ASSEMBLY

BACKGROUND OF THE INVENTION

Field of the Invention

The present invention relates to a membrane electrode assembly manufacturing apparatus which forms an electrode layer on a surface of an elongated strip-shaped electrolyte membrane while transporting the electrolyte membrane.

Description of the Background Art

In recent years, attention has been given to fuel cells as power sources for driving motor vehicles, mobile phones and the like. A fuel cell is a power generation system that generates electric power through an electrochemical reaction between hydrogen ($H_2$) contained in a fuel and oxygen ($O_2$) in the air. The fuel cell has advantages over other cells in its high power generation efficiency and low environmental load.

There are several types of fuel cells that are different depending on electrolytes being used therein. One of these fuel cells is a polymer electrolyte fuel cell (PEFC) including an ion exchange membrane (electrolyte membrane) used as the electrolyte. Polymer electrolyte fuel cells, which are capable of operating at room temperature and can be reduced in size and weight, are expected to be applied to motor vehicles and portable devices.

In general, the polymer electrolyte fuel cells have a structure such that multiple cells are stacked one on top of another. One cell is comprised of a membrane electrode assembly (MEA) and a pair of separators provided on opposite sides of the membrane electrode assembly to sandwich the membrane electrode assembly therebetween. The membrane electrode assembly includes an electrolyte membrane and a pair of electrode layers formed on opposite surfaces of the electrolyte membrane. One of the two electrode layers is an anode electrode, and the other thereof is a cathode electrode. When a fuel gas containing hydrogen comes in contact with the anode electrode and air comes in contact with the cathode electrode, electric power is generated through an electrochemical reaction.

The aforementioned membrane electrode assembly is typically produced by applying a catalyst ink (electrode paste) to a surface of an electrolyte membrane and then drying the catalyst ink. The catalyst ink is obtained by dispersing catalyst particles containing platinum (Pt) in a solvent such as alcohol. A conventional technique of manufacturing such a membrane electrode assembly is disclosed, for example, in Japanese Patent Application Laid-Open No. 2013-161557.

In a manufacturing apparatus disclosed in Japanese Patent Application Laid-Open No. 2013-161557, an electrolyte membrane is held on an outer peripheral surface of a sucking roll, with a porous base material therebetween. While the porous base material and the electrolyte membrane are transported by rotating the sucking roll, a catalyst ink is ejected from a nozzle, so that the surface of the electrolyte membrane is coated with the catalyst ink. In such a manufacturing apparatus, multiple base materials are transported to and from the sucking roll. Accordingly, multiple rollers are disposed around the sucking roll.

The nozzle for ejecting the catalyst ink and piping require maintenance such as cleaning in a disassembled state at regular time intervals. This involves the need to ensure not only the multiple rollers but also space for maintenance around the sucking roll.

SUMMARY OF THE INVENTION

In view of the foregoing, it is therefore an object of the present invention to provide a layout of a membrane electrode assembly manufacturing apparatus which is capable of lowering the height of the apparatus while ensuring space for maintenance.

To solve the aforementioned problem, a first aspect of the present invention is intended for an apparatus for manufacturing a membrane electrode assembly. The apparatus forms an electrode layer on a surface of an elongated strip-shaped electrolyte membrane while transporting the electrolyte membrane. The apparatus comprises: a suction roller having an outer peripheral surface and rotating while developing a negative pressure on the outer peripheral surface thereof; a porous base material supply roller for unwinding an elongated strip-shaped porous base material therefrom toward the outer peripheral surface of the suction roller; a porous base material collection roller for winding thereon the porous base material separated from the outer peripheral surface of the suction roller; an electrolyte membrane supply roller for unwinding the electrolyte membrane therefrom toward a surface of the porous base material held on the outer peripheral surface of the suction roller; an electrolyte membrane collection roller for winding thereon the electrolyte membrane separated from the surface of the porous base material; an application part for applying an electrode material onto the surface of the electrolyte membrane around the suction roller; and a maintenance space for performing maintenance on the application part, the porous base material supply roller and the porous base material collection roller are disposed on the opposite side of the suction roller from the maintenance space as seen in a horizontal direction.

According to the first aspect of the present invention, the porous base material supply roller and the porous base material collection roller are collectively disposed on one side of the suction roller. This ensures the maintenance space on the opposite side of the suction roller. Also, this arrangement lowers the height dimension of the manufacturing apparatus, as compared with the arrangement of all of the porous base material supply roller, the porous base material collection roller and the maintenance space on one side of the suction roller.

These and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment according to the present invention will now be described with reference to the drawings.

<1. Configuration of Manufacturing Apparatus>

Figure 1:
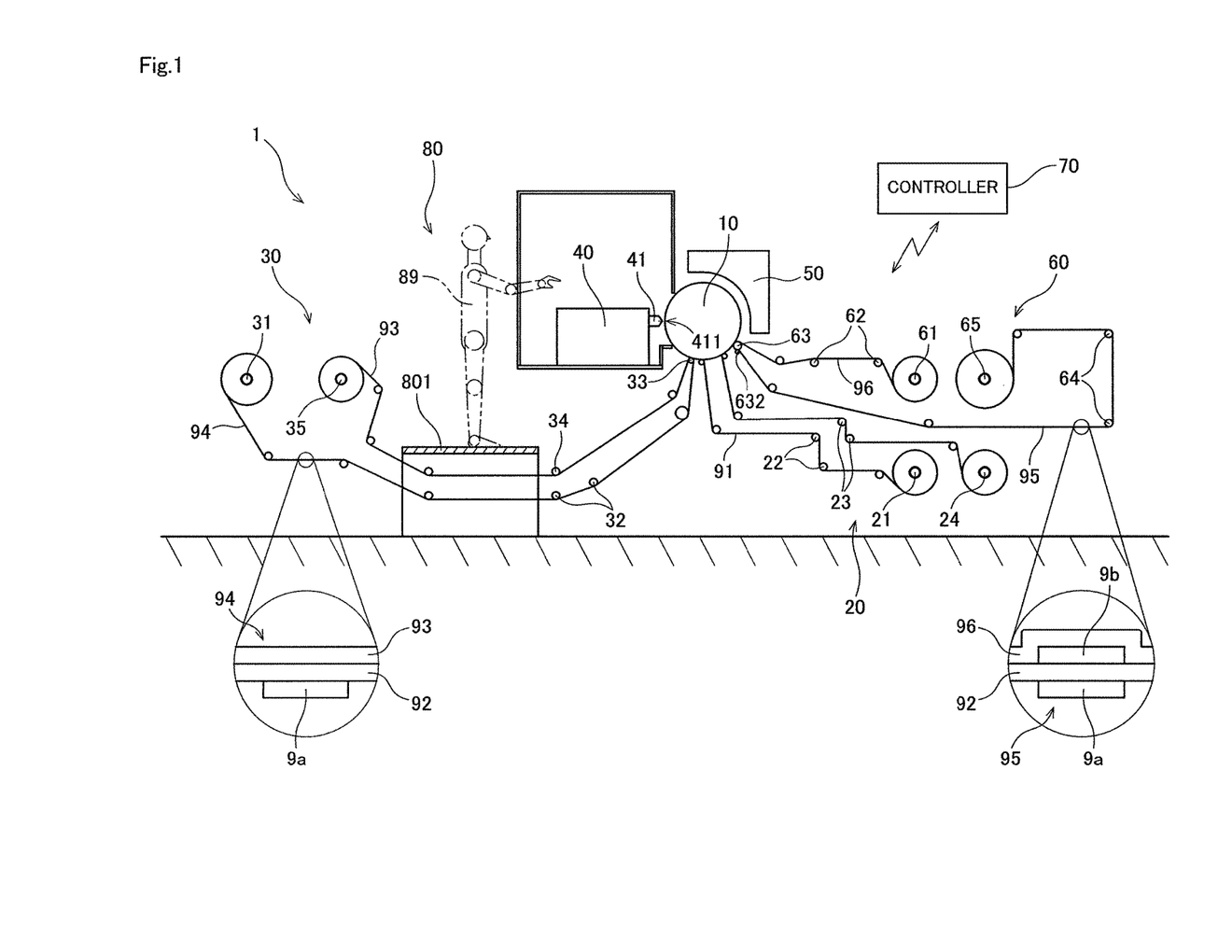
FIG. 1 is a diagrammatic view showing a configuration of a membrane electrode assembly manufacturing apparatus.

FIG. 1 is a diagrammatic view showing the configuration of a membrane electrode assembly manufacturing apparatus 1 according to one preferred embodiment of the present invention. This manufacturing apparatus 1 is an apparatus that forms an electrode layer on a surface of an electrolyte membrane which is an elongated strip-shaped base material to manufacture a membrane electrode assembly for a polymer electrolyte fuel cell. As shown in FIG. 1, the membrane electrode assembly manufacturing apparatus 1 according to the present preferred embodiment includes a suction roller 10, a porous base material supply and collection part 20, an electrolyte membrane supply part 30, an application part 40, a drying furnace 50, an assembly collection part 60 and a controller 70.

Figure 2:
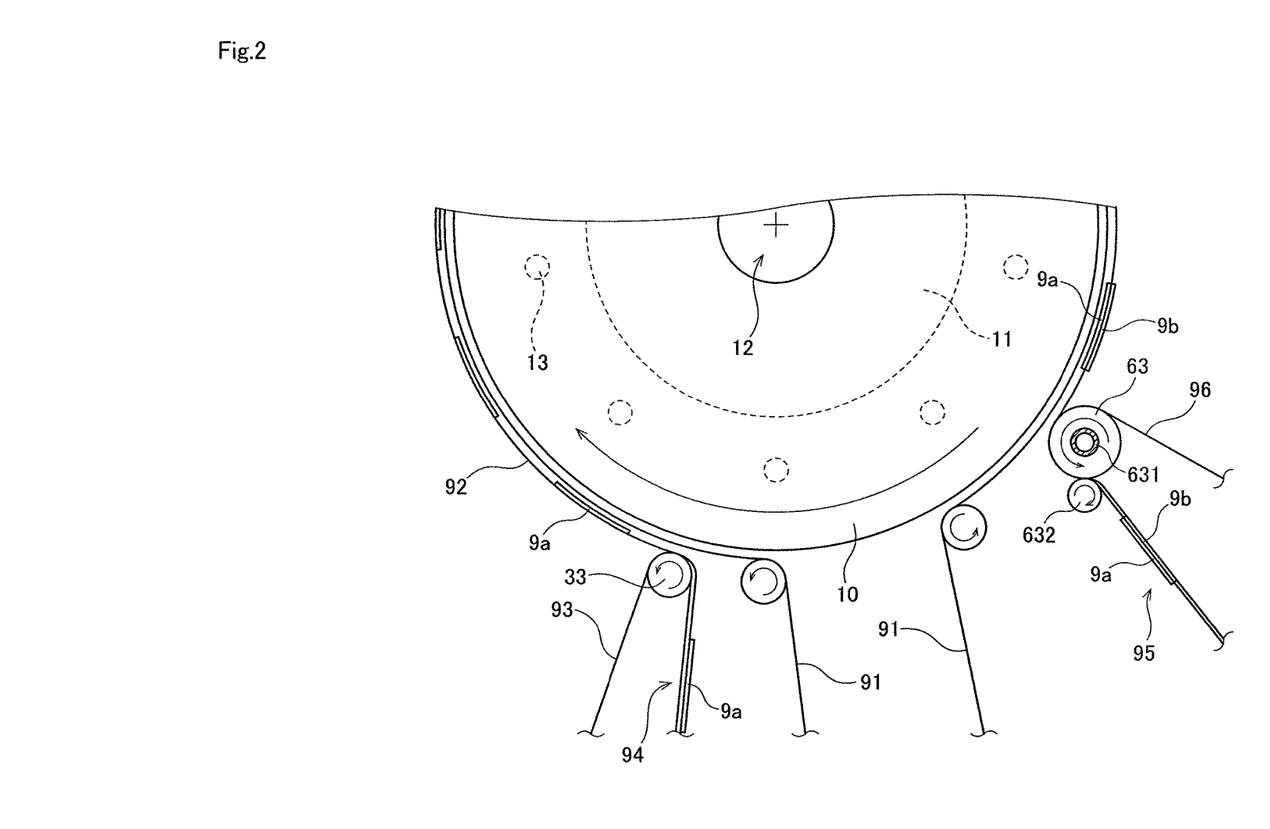
FIG. 2 is an enlarged view of a lower portion of a suction roller and its surroundings.

The suction roller 10 is a roller that rotates while holding a porous base material 91 and an electrolyte membrane 92 under suction. The suction roller 10 has a cylindrical outer peripheral surface with a plurality of suction holes. The suction roller 10 has a diameter in the range of 200 to 1600 mm, for example. FIG. 2 is an enlarged view of a lower portion of the suction roller 10 and its surroundings. As indicated by a broken line in FIG. 2, a rotary driver 11 having a driving source such as a motor is connected to the suction roller 10. When the rotary driver 11 is put into operation, the suction roller 10 rotates about a horizontally extending axis.

Examples of the material of the suction roller 10 used herein include porous materials such as porous carbon and porous ceramics. Specific examples of the porous ceramics include sintered bodies of alumina ($Al_2O_3$) and silicon carbide (SiC). The porous suction roller 10 has pores with a diameter of not greater than 5 μm, for example, and a porosity in the range of 15% to 50%, for example.

Metal may be used in place of the porous materials as the material of the suction roller 10. Specific examples of the metal include stainless steel and iron. When metal is used as the material of the suction roller 10, minute suction holes may be formed in the outer peripheral surface of the suction roller 10 by machining. Preferably, the suction holes have a diameter of not greater than 2 mm for the purpose of preventing the occurrence of suction marks.

The suction roller 10 has an end surface provided with a sucking port 12. The sucking port 12 is connected to a sucking mechanism (e.g., an exhaust pump) not shown. When the sucking mechanism is put into operation, a negative pressure (vacuum) is developed in the sucking port 12 of the suction roller 10. Then, a negative pressure is developed also in the suction holes provided in the outer peripheral surface of the suction roller 10 through the pores in the suction roller 10. The porous base material 91 and the electrolyte membrane 92 are transported in the form of an arc by the rotation of the suction roller 10 while being held on the outer peripheral surface of the suction roller 10 under suction by the negative pressure.

Multiple water-cooled tubes 13 are provided inside the suction roller 10, as indicated by broken lines in FIG. 2. Cooling water temperature-controlled at a predetermined temperature is supplied from a water supply mechanism not shown to the water-cooled tubes 13. When the manufacturing apparatus 1 is in operation, the heat of the suction roller 10 is absorbed by the cooling water serving as a heat medium. Thus, the suction roller 10 is cooled. After absorbing the heat, the cooling water is discharged to a drainage mechanism not shown.

A heating mechanism such as a hot-water circulation mechanism and a heater may be provided in place of the drying furnace 50 to be described later inside the suction roller 10. In that case, the temperature of the outer peripheral surface of the suction roller 10 may be controlled by controlling the heating mechanism provided inside the suction roller 10 without the provision of the water-cooled tubes inside the suction roller 10.

The porous base material supply and collection part 20 is a section for supplying the elongated strip-shaped porous base material 91 toward the suction roller 10 and for collecting the porous base material 91 after use. The porous base material 91 is a base material having a large number of minute pores to allow air to pass therethrough. Preferably, the porous base material 91 is made of a material less prone to produce dust particles. As shown in FIG. 1, the porous base material supply and collection part 20 includes a porous base material supply roller 21, a plurality of porous base material carrying-in rollers 22, a plurality of porous base material carrying-out rollers 23 and a porous base material collection roller 24. The porous base material supply roller 21, the porous base material carrying-in rollers 22, the porous base material carrying-out rollers 23 and the porous base material collection roller 24 are disposed parallel to the suction roller 10.

Before being supplied, the porous base material 91 is wound on the porous base material supply roller 21. The porous base material supply roller 21 is rotated by the power of a motor not shown. As the porous base material supply roller 21 rotates, the porous base material 91 is unwound from the porous base material supply roller 21. The unwound porous base material 91 is transported along a predetermined carrying-in path to the outer peripheral surface of the suction roller 10 while being guided by the porous base material carrying-in rollers 22. Then, the porous base material 91 is transported in the form of an arc by the rotation of the suction roller 10 while being held on the outer peripheral surface of the suction roller 10 under suction. The suction roller 10 and the porous base material 91 held on the suction roller 10 are shown in FIG. 2 as spaced apart from each other for ease of understanding.

The porous base material 91 is transported through an angle of not less than 180°, preferably not less than 270°, about the axis of the suction roller 10. Thereafter, the porous base material 91 is moved away from the outer peripheral surface of the suction roller 10. The porous base material 91 moved away from the suction roller 10 is transported along a predetermined carrying-out path to the porous base material collection roller 24 while being guided by the porous base material carrying-out rollers 23. The porous base material collection roller 24 is rotated by the power of a motor not shown. Thus, the porous base material 91 after use is wound on the porous base material collection roller 24.

The electrolyte membrane supply part 30 is a section for supplying a laminated base material 94 comprised of two layers of the electrolyte membrane 92 and a first support film 93 to around the suction roller 10 and for separating the first support film 93 from the electrolyte membrane 92.

For example, a fluorine-based or hydrocarbon-based polymer electrolyte membrane is used as the electrolyte membrane 92. Specific examples of the electrolyte membrane 92 used herein include polymer electrolyte membranes containing perfluorocarbon sulfonic acid (e.g., Nafion® available from DuPont, USA; Flemion® available from Asahi Glass Co., Ltd.; Aciplex® available from Asahi Kasei Corporation; and Goreselect® available from W. L. Gore & Associates, Inc.). The electrolyte membrane 92 has a thickness in the range of 5 to 30 μm, for example. The electrolyte membrane 92 swells when exposed to moisture in the atmosphere, and shrinks when the humidity of the atmosphere is decreased. That is, the electrolyte membrane 92 has the property of being easily deformable depending on the humidity of the atmosphere.

The first support film 93 is a film for suppressing the deformation of the electrolyte membrane 92. Resins having a mechanical strength higher than that of the electrolyte membrane 92 and excellent in shape retaining function are used as the material of the first support film 93. Specific examples of the first support film 93 used herein include films made of PEN (polyethylene naphthalate) and PET (polyethylene terephthalate). The first support film 93 has a thickness in the range of 25 to 100 μm, for example.

As shown in FIG. 1, the electrolyte membrane supply part 30 includes a laminated base material supply roller 31 (electrolyte membrane supply roller), a plurality of laminated base material carrying-in rollers 32, a separation roller 33, a plurality of first support film carrying-out rollers 34 and a first support film collection roller 35. The laminated base material supply roller 31, the laminated base material carrying-in rollers 32, the separation roller 33, the first support film carrying-out rollers 34 and the first support film collection roller 35 are disposed parallel to the suction roller 10.

Before being supplied, the laminated base material 94, with the first support film 93 positioned inside, is wound on the laminated base material supply roller 31. In the present preferred embodiment, an electrode layer (referred to hereinafter as a "first electrode layer 9a") is previously formed on a surface (referred to hereinafter as a "first surface") of the electrolyte membrane 92 opposite from the first support film 93. The first electrode layer 9a is formed in an apparatus different from the manufacturing apparatus 1 by intermittently applying an electrode material to the first surface of the electrolyte membrane 92 while transporting the laminated base material 94 comprised of the two layers of the first support film 93 and the electrolyte membrane 92 by a roll-to-roll process and then drying the applied electrode material.

The laminated base material supply roller 31 is rotated by the power of a motor not shown. As the laminated base material supply roller 31 rotates, the laminated base material 94 is unwound from the laminated base material supply roller 31. The unwound laminated base material 94 is transported along a predetermined carrying-in path to the separation roller 33 while being guided by the laminated base material carrying-in rollers 32.

The separation roller 33 is a roller for separating the first support film 93 from the electrolyte membrane 92. The separation roller 33 has a cylindrical outer peripheral surface with a diameter less than that of the suction roller 10. At least the outer peripheral surface of the separation roller 33 is made of an elastic body. The separation roller 33 is disposed adjacent to the suction roller 10 and slightly downstream from the position where the porous base material 91 is introduced onto the suction roller 10 as seen in the direction of rotation of the suction roller 10. The separation roller 33 is pressurized toward the suction roller 10 by an air cylinder not shown.

As shown in FIG. 2, the laminated base material 94 transported by the laminated base material carrying-in rollers 32 is introduced to between the suction roller 10 and the separation roller 33. At this time, the first surface of the electrolyte membrane 92 together with the first electrode layer 9a comes in contact with a surface of the porous base material 91 held on the suction roller 10, and the first support film 93 comes in contact with the outer peripheral surface of the separation roller 33. The laminated base material 94 is pressed toward the suction roller 10 by the pressure received from the separation roller 33. A sucking force from the suction roller 10 develops a negative pressure on the surface of the porous base material 91 held on the suction roller 10. The electrolyte membrane 92 is suctioned onto the surface of the porous base material 91 by the negative pressure. The electrolyte membrane 92 together with the porous base material 91 is transported in the form of an arc by the rotation of the suction roller 10 while being held on the suction roller 10. The porous base material 91 and the electrolyte membrane 92 held on the suction roller 10 are shown in FIG. 2 as spaced apart from each other for ease of understanding.

In the present preferred embodiment, the porous base material 91 is interposed between the outer peripheral surface of the suction roller 10 and the electrolyte membrane 92 in this manner. Thus, there is no direct contact between the outer peripheral surface of the suction roller 10 and the first electrode layer 9a formed on the first surface of the electrolyte membrane 92. This prevents part of the first electrode layer 9a from adhering to the outer peripheral surface of the suction roller 10, and prevents foreign materials from being transferred from the outer peripheral surface of the suction roller 10 to the electrolyte membrane 92.

On the other hand, the first support film 93 having passed between the suction roller 10 and the separation roller 33 is transported away from the suction roller 10 toward the first support film carrying-out rollers 34. Thus, the first support film 93 is separated from the electrolyte membrane 92. As a result, the opposite surface (referred to hereinafter as a "second surface") of the electrolyte membrane 92 from the first surface is exposed. The separated first support film 93 is transported along a predetermined carrying-out path to the first support film collection roller 35 while being guided by the first support film carrying-out rollers 34. The first support film collection roller 35 is rotated by the power of a motor not shown. Thus, the first support film 93 is wound on the first support film collection roller 35.

The application part 40 is a mechanism for applying an electrode material onto the second surface of the electrolyte membrane 92 around the suction roller 10. A catalyst ink obtained by dispersing catalyst particles containing platinum (Pt) in a solvent such as alcohol, for example, is used as the electrode material. As shown in FIG. 1, the application part 40 includes a nozzle 41. The nozzle 41 is provided downstream from the separation roller 33 as seen in a direction (transport direction) in which the electrolyte membrane 92 is transported by the suction roller 10. The nozzle 41 has an ejection orifice 411 opposed to the outer peripheral surface of the suction roller 10. The ejection orifice 411 is a slit-shaped opening extending horizontally along the outer peripheral surface of the suction roller 10.

The nozzle 41 is connected to an electrode material supply source not shown. When the application part 40 is driven, the electrode material is supplied from the electrode material supply source through piping to the nozzle 41. Then, the electrode material is ejected from the ejection orifice 411 of the nozzle 41 toward the second surface of the electrolyte membrane 92. Thus, the electrode material is applied to the second surface of the electrolyte membrane 92.

In the present preferred embodiment, the electrode material is intermittently ejected from the ejection orifice 411 of the nozzle 41 by opening and closing a valve connected to the nozzle 41 at fixed time intervals. This causes the electrode material to be intermittently applied to the second surface of the electrolyte membrane 92 at fixedly spaced intervals in the transport direction. Alternatively, the electrode material may be continuously applied to the second surface of the electrolyte membrane 92 in the transport direction by continuously opening the valve.

A material that causes a fuel cell reaction to occur in the anode or cathode of a polymer fuel cell is used for the catalyst particles in the electrode material. Specifically, particles of platinum (Pt), a platinum alloy, a platinum compound and the like may be used as the catalyst particles. Examples of the platinum alloy used herein include alloys of platinum and at least one metal selected from the group consisting of ruthenium (Ru), palladium (Pd), nickel (Ni), molybdenum (Mo), iridium (Ir), iron (Fe) and the like. In general, platinum is used as the electrode material for the cathode, and any one of the platinum alloys is used as the electrode material for the anode. The electrode material ejected from the nozzle 41 may be for the cathode or for the anode. It should be noted that electrode materials of polarities opposite from each other are used for the electrode layers 9a and 9b formed on the front and back surfaces of the electrolyte membrane 92.

The nozzle 41 and piping in the application part 40 require maintenance such as cleaning in a disassembled state at regular time intervals. To this end, the manufacturing apparatus 1 includes a maintenance space 80 for the maintenance of the application part 40. In the present preferred embodiment, the maintenance space 80 is disposed between the application part 40 and the first support film collection roller 35. For the maintenance of the application part 40, an operator 89 stands on a platform 801 provided in the maintenance space 80 to clean the parts constituting the application part 40.

The drying furnace 50 is a section for drying the electrode material applied to the second surface of the electrolyte membrane 92. The drying furnace 50 according to the present preferred embodiment is disposed downstream from the application part 40 as seen in the direction in which the electrolyte membrane 92 is transported by the suction roller 10. The drying furnace 50 is provided in the form of an arc along the outer peripheral surface of the suction roller 10. The drying furnace 50 blows heated gases (hot gases) toward the second surface of the electrolyte membrane 92 around the suction roller 10. Then, the electrode material applied to the second surface of the electrolyte membrane 92 is heated, so that the solvent in the electrode material is evaporated. This dries the electrode material to form an electrode layer (referred to hereinafter as a "second electrode layer 9b") on the second surface of the electrolyte membrane 92. As a result, this provides a membrane electrode assembly 95 comprised of the electrolyte membrane 92, the first electrode layer 9a and the second electrode layer 9b.

The assembly collection part 60 is a section for affixing a second support film 96 to the membrane electrode assembly 95 to collect the membrane electrode assembly 95. As shown in FIG. 1, the assembly collection part 60 includes a second support film supply roller 61, a plurality of second support film carrying-in rollers 62, a laminating roller 63, a plurality of assembly carrying-out rollers 64 and an assembly collection roller 65 (electrolyte membrane collection roller). The second support film supply roller 61, the second support film carrying-in rollers 62, the laminating roller 63, the assembly carrying-out rollers 64 and the assembly collection roller 65 are disposed parallel to the suction roller 10.

Before being supplied, the second support film 96 is wound on the second support film supply roller 61. The second support film supply roller 61 is rotated by the power of a motor not shown. As the second support film supply roller 61 rotates, the second support film 96 is unwound from the second support film supply roller 61. The unwound second support film 96 is transported along a predetermined carrying-in path to the laminating roller 63 while being guided by the second support film carrying-in rollers 62.

Resins having a mechanical strength higher than that of the electrolyte membrane 92 and excellent in shape retaining function are used as the material of the second support film 96. Specific examples of the second support film 96 used herein include films made of PEN (polyethylene naphthalate) and PET (polyethylene terephthalate). The second support film 96 has a thickness in the range of 25 to 100 μm, for example. The second support film 96 may be the same film as the first support film 93. Also, the first support film 93 wound on the first support film collection roller 35 may be unwound as the second support film 96 from the second support film supply roller 61.

The laminating roller 63 is a roller for affixing the second support film 96 to the membrane electrode assembly 95. An example of the material of the laminating roller 63 used herein includes rubber having high heat resistance. The laminating roller 63 has a cylindrical outer peripheral surface smaller in diameter than the suction roller 10. The laminating roller 63 is disposed adjacent to the suction roller 10 and at a position downstream from the drying furnace 50 and upstream from the position where the porous base material 91 is separated from the suction roller 10 as seen in the direction of rotation of the suction roller 10. The laminating roller 63 is pressurized toward the suction roller 10 by an air cylinder not shown.

As shown in FIG. 2, a heater 631 that generates heat when energized is provided inside the laminating roller 63. A sheathed heater, for example, is used as the heater 631. When the heater 631 is energized, the outer peripheral surface of the laminating roller 63 is temperature-controlled at a predetermined temperature higher than the environmental temperature by the heat generated from the heater 631. An output from the heater 631 may be controlled so that the temperature of the outer peripheral surface of the laminating roller 63 measured using a temperature sensor such as a radiation thermometer reaches a fixed temperature based on the result of measurement.

As shown in FIG. 2, the second support film 96 transported by the second support film carrying-in rollers 62 is introduced to between the membrane electrode assembly 95 transported around the suction roller 10 and the laminating roller 63. At this time, the second support film 96 is pressed against the membrane electrode assembly 95 by the pressure received from the laminating roller 63, and is heated by the heat of the laminating roller 63. As a result, the second support film 96 is affixed to the second surface of the electrolyte membrane 92. The second electrode layer 9b formed on the second surface of the electrolyte membrane 92 is sandwiched between the electrolyte membrane 92 and the second support film 96.

The membrane electrode assembly 95 with the second support film 96 having passed between the suction roller 10 and the laminating roller 63 is transported away from the suction roller 10. Thus, the membrane electrode assembly 95 is separated from the porous base material 91.

In the present preferred embodiment, a pressure roller 632 is disposed near the laminating roller 63. The pressure roller 632 is disposed adjacent to the laminating roller 63 and downstream from a gap between the suction roller 10 and the laminating roller 63 as seen in the transport direction of the membrane electrode assembly 95. The pressure roller 632 is pressurized toward the laminating roller 63 by an air cylinder not shown. The membrane electrode assembly 95 with the second support film 96 separated from the porous base material 91 subsequently passes between the laminating roller 63 and the pressure roller 632. This promotes the adhesion of the second support film 96 to the second surface of the electrolyte membrane 92.

Thereafter, the membrane electrode assembly 95 with the second support film 96 is transported along a predetermined carrying-out path to the assembly collection roller 65 while being guided by the assembly carrying-out rollers 64. The assembly collection roller 65 is rotated by the power of a motor not shown. Thus, the membrane electrode assembly 95 with the second support film 96 is wound on the assembly collection roller 65, with the second support film 96 positioned outside.

In this manner, the steps of unwinding the laminated base material 94 from the laminated base material supply roller 31, separating the first support film 93 from the electrolyte membrane 92, applying the electrode material to the electrolyte membrane 92, drying by means of the drying furnace 50, affixing the second support film 96 to the electrolyte membrane 92, and winding the membrane electrode assembly 95 on the assembly collection roller 65 are performed sequentially in the manufacturing apparatus 1 according to the present preferred embodiment. This achieves the manufacture of the membrane electrode assembly 95 used for the electrodes of the polymer electrolyte fuel cell. The electrolyte membrane 92 is always held by any one of the first support film 93, the suction roller 10 and the second support film 96. This suppresses the deformation, such as swelling and shrinking, of the electrolyte membrane 92 in the manufacturing apparatus 1.

Figure 3:
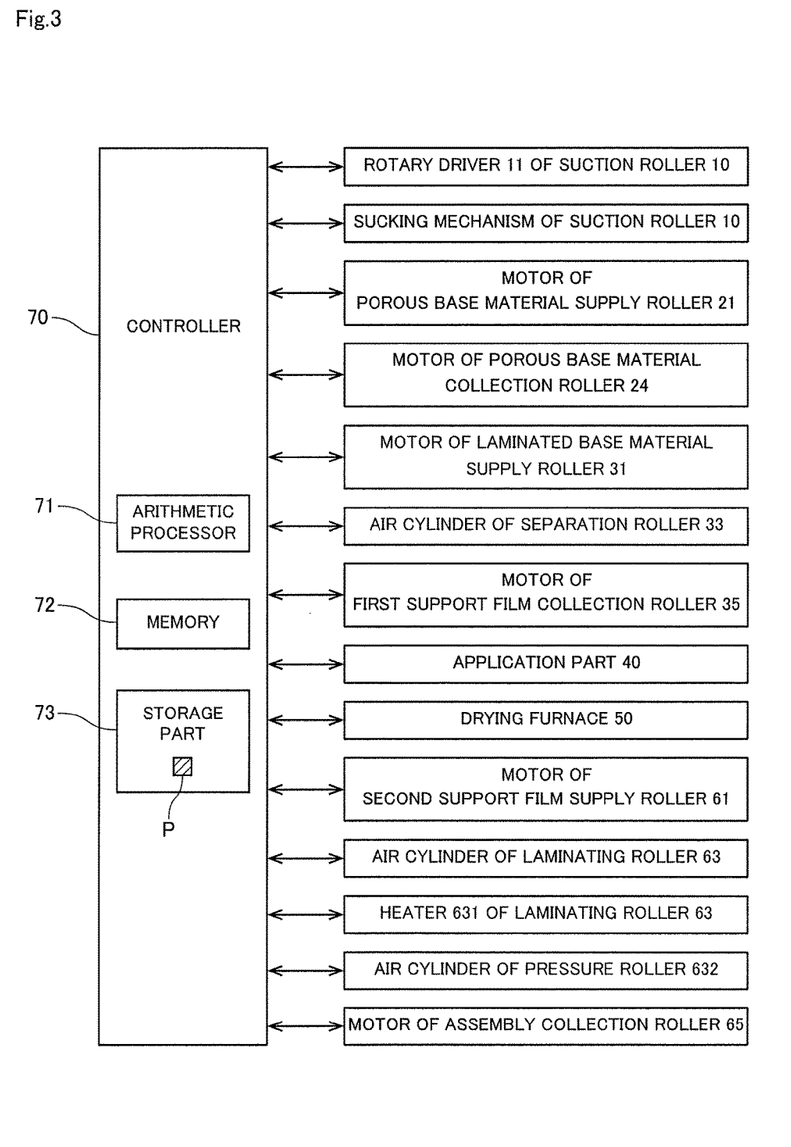
FIG. 3 is a block diagram showing connections between a controller and parts of the manufacturing apparatus.

The controller 70 is a part for controlling the operations of the components in the manufacturing apparatus 1. FIG. 3 is a block diagram showing connections between the controller 70 and the components in the manufacturing apparatus 1. As conceptually shown in FIG. 3, the controller 70 is formed by a computer including an arithmetic processor 71 such as a CPU, a memory 72 such as a RAM and a storage part 73 such as a hard disk drive. A computer program P for executing the process of manufacturing the membrane electrode assembly is installed in the storage part 73.

As shown in FIG. 3, the controller 70 is connected to the rotary driver 11 of the suction roller 10, the sucking mechanism of the suction roller 10, the motor of the porous base material supply roller 21, the motor of the porous base material collection roller 24, the motor of the laminated base material supply roller 31, the air cylinder of the separation roller 33, the motor of the first support film collection roller 35, the application part 40, the drying furnace 50, the motor of the second support film supply roller 61, the air cylinder of the laminating roller 63, the heater 631 of the laminating roller 63, the air cylinder of the pressure roller 632 and the motor of the assembly collection roller 65 for communication therewith.

The controller 70 temporarily reads the computer program P and data that are stored in the storage part 73 onto the memory 72, and the arithmetic processor 71 performs arithmetic processing based on the computer program P, so that the controller 70 controls the operations of the aforementioned components. Thus, the process of manufacturing the membrane electrode assembly in the manufacturing apparatus 1 proceeds.

<2. Arrangement of Rollers and Maintenance Space>

Figure 4:
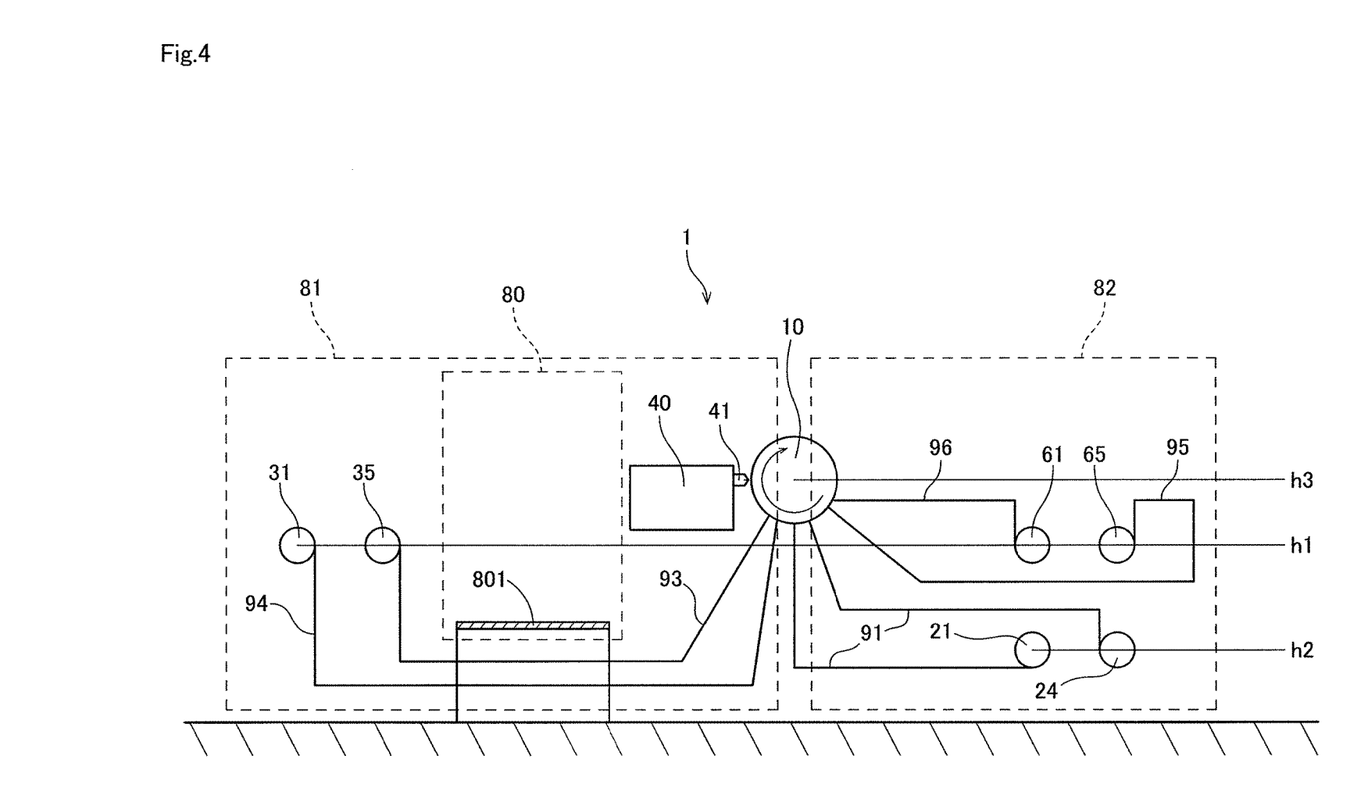
FIG. 4 is a conceptual view showing a layout of the manufacturing apparatus.

Next, the arrangement of the rollers and the maintenance space in the manufacturing apparatus 1 will be described. FIG. 4 is a conceptual view showing a layout of the manufacturing apparatus 1.

As shown in FIG. 4, the laminated base material supply roller 31, the first support film collection roller 35 and the maintenance space 80 in this manufacturing apparatus 1 are disposed in a space (referred to hereinafter as an "upstream space 81") lying on one side of the suction roller 10 as seen in a horizontal direction (a horizontal direction perpendicular to the axis of the suction roller 10). The porous base material supply roller 21, the porous base material collection roller 24, the second support film supply roller 61 and the assembly collection roller 65 are disposed in a space (referred to hereinafter as a "downstream space 82") lying on the other side of the suction roller 10 as seen in the horizontal direction.

That is, the porous base material supply roller 21 and the porous base material collection roller 24 in this manufacturing apparatus 1 are collectively disposed in the downstream space 82 lying on one of the sides of the suction roller 10. This allows the wide maintenance space 80 to be ensured in the upstream space 81 lying on the opposite side of the suction roller 10. Also, the arrangement of the rollers 21 and 24 and the maintenance space 80 in the spaces on the opposite sides from each other lowers the height dimension of the manufacturing apparatus 1, as compared with the arrangement of all of the rollers 21 and 24 and the maintenance space 80 in one of the spaces.

In particular, the maintenance space 80 in this manufacturing apparatus 1 is disposed in the upstream space 81 in which the laminated base material supply roller 31 is disposed. The porous base material supply roller 21 and the porous base material collection roller 24 are disposed in the downstream space 82 in which the assembly collection roller 65 is disposed. Thus, the porous base material supply roller 21 and the porous base material collection roller 24 which serve as drivers are kept away from the electrolyte membrane 92 not yet subjected to the application process. This suppresses the adhesion of dust particles to the electrolyte membrane 92 not yet subjected to the application process if the dust particles are produced from the porous base material supply roller 21 and the porous base material collection roller 24.

Also, the maintenance space 80 in the manufacturing apparatus 1 is positioned between the suction roller 10 and the rollers 31 and 35. Both of the laminated base material 94 unwound from the laminated base material supply roller 31 and the separated first support film 93 pass under the platform 801 of the maintenance space 80. Such a configuration further lowers the height dimension of the manufacturing apparatus 1, as compared with the configuration in which the laminated base material 94 and the first support film 93 pass over the maintenance space 80.

As mentioned above, the first electrode layer 9a is already formed on the first surface of the electrolyte membrane 92 unwound from the laminated base material supply roller 31 in the manufacturing apparatus 1. For this reason, the number of laminated base material carrying-in rollers 32 disposed on the first surface side of the electrolyte membrane 92 of all the laminated base material carrying-in rollers 32 is less than the number of laminated base material carrying-in rollers 32 disposed on the second surface side of the electrolyte membrane 92, as shown in FIG. 1. This reduces the number of times that the laminated base material carrying-in rollers 32 come in contact with the first electrode layer 9a already formed on the first surface of the electrolyte membrane 92. As a result, this suppresses damages to the first electrode layer 9a and the adhesion of dust particles to the first electrode layer 9a.

As shown in FIG. 1, all of the assembly carrying-out rollers 64 in the manufacturing apparatus 1 are disposed on the second surface side of the electrolyte membrane 92. In other words, all of the assembly carrying-out rollers 64 come in contact with the second support film 96. This suppresses damages caused by the assembly carrying-out rollers 64 to the first surface of the electrolyte membrane 92 not protected by the second support film 96 and to the first electrode layer 9a formed on the first surface, and the adhesion of dust particles to the first electrode layer 9a.

As shown in FIG. 4, the laminated base material supply roller 31 and the first support film collection roller 35 in the manufacturing apparatus 1 are disposed adjacent to each other at the same height h1. This configuration lowers the height dimension of the manufacturing apparatus 1, as compared with the configuration in which the laminated base material supply roller 31 and the first support film collection roller 35 are disposed at different heights. This configuration also allows the same transport apparatus to be used for the replacement of the laminated base material 94 on the laminated base material supply roller 31 and for the replacement of the first support film 93 on the first support film collection roller 35. Therefore, these replacements are facilitated.

The second support film supply roller 61 and the assembly collection roller 65 in the manufacturing apparatus 1 are disposed adjacent to each other at the same height h1. This configuration lowers the height dimension of the manufacturing apparatus 1, as compared with the configuration in which the second support film supply roller 61 and the assembly collection roller 65 are disposed at different heights. This configuration also allows the same transport apparatus to be used for the replacement of the second support film 96 on the second support film supply roller 61 and for the replacement of the membrane electrode assembly 95 on the assembly collection roller 65. Therefore, these replacements are facilitated.

The porous base material supply roller 21 and the porous base material collection roller 24 in the manufacturing apparatus 1 are disposed adjacent to each other at the same height h2. This configuration lowers the height dimension of the manufacturing apparatus 1, as compared with the configuration in which the porous base material supply roller 21 and the porous base material collection roller 24 are disposed at different heights. This configuration also allows the same transport apparatus to be used for the replacement of the porous base material 91 on the porous base material supply roller 21 and for the replacement of the porous base material 91 on the porous base material collection roller 24. Therefore, these replacements are facilitated.

Further, the laminated base material supply roller 31 and the first support film collection roller 35 are disposed at the same height as the second support film supply roller 61 and the assembly collection roller 65 in the manufacturing apparatus 1. This configuration lowers the height dimension of the manufacturing apparatus 1, as compared with the configuration in which the four rollers 31, 35, 61 and 65 are disposed at different heights. This configuration also allows the same transport apparatus to be used for the replacements of the base materials on the four rollers 31, 35, 61 and 65. Therefore, these replacements are facilitated.

The porous base material supply roller 21, the porous base material collection roller 24, the laminated base material supply roller 31, the first support film collection roller 35, the second support film supply roller 61 and the assembly collection roller 65 in the manufacturing apparatus 1 are disposed below the suction roller 10. This configuration makes dust particles less prone to fly and scatter around the suction roller 10 if the dust particles are generated from the porous base material supply roller 21, the porous base material collection roller 24, the laminated base material supply roller 31, the first support film collection roller 35, the second support film supply roller 61 and the assembly collection roller 65 which serve as drivers. This reduces the risk of failures occurring in the process of applying the electrode material.

Further, the porous base material carrying-in rollers 22, the porous base material carrying-out rollers 23, the laminated base material carrying-in rollers 32, the first support film carrying-out rollers 34, the second support film carrying-in rollers 62 and the assembly carrying-out rollers 64 in the manufacturing apparatus 1 are disposed below the suction roller 10, as shown in FIG. 1. This configuration makes dust particles less prone to fly and scatter around the suction roller 10 if the dust particles are generated from the rollers 22, 23, 32, 34, 62 and 64 which serve as drivers. This further reduces the risk of failures occurring in the process of applying the electrode material.

<3. Modifications>

While the one preferred embodiment according to the present invention has been described hereinabove, the present invention is not limited to the aforementioned preferred embodiment.

Figure 5:
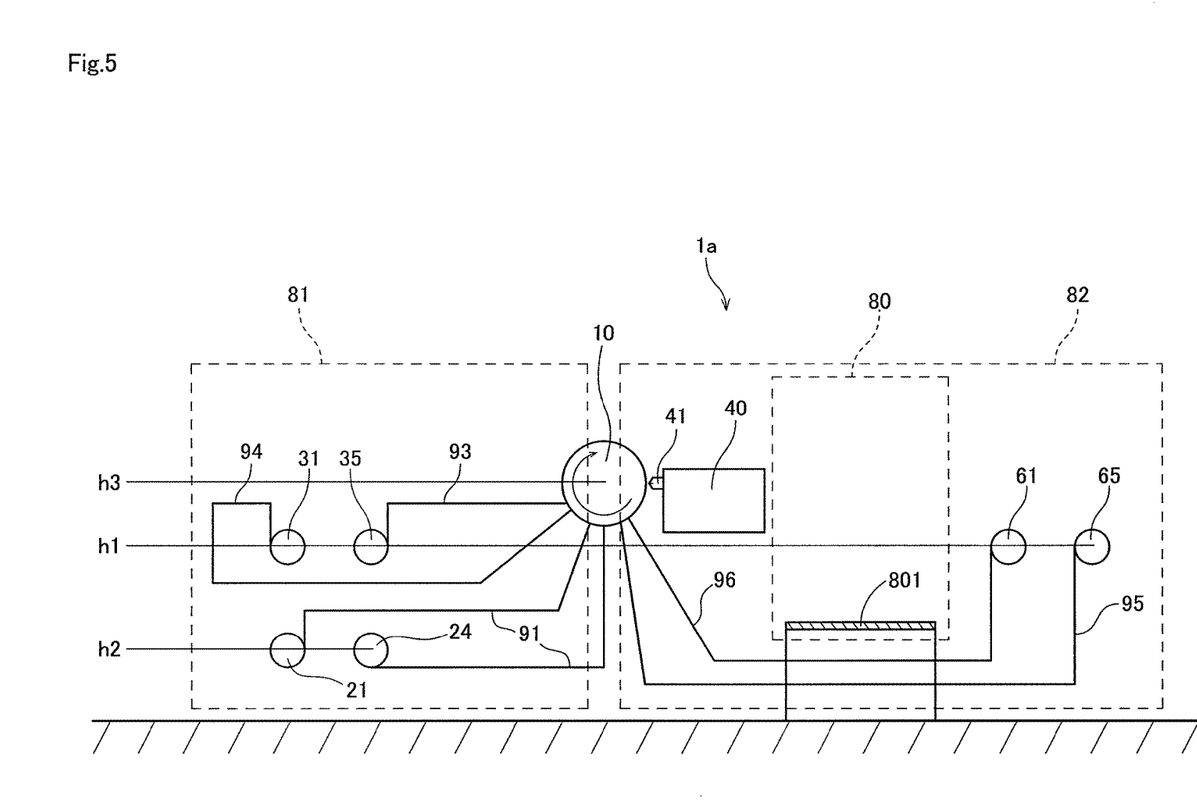
FIG. 5 is a conceptual view showing another layout of the manufacturing apparatus according to a modification.

FIG. 5 is a conceptual view showing a layout of a manufacturing apparatus 1a according to a modification. In the modification of FIG. 5, the porous base material supply roller 21, the porous base material collection roller 24, the laminated base material supply roller 31 and the first support film collection roller 35 are disposed in the upstream space 81. The second support film supply roller 61, the assembly collection roller 65 and the maintenance space 80 are disposed in the downstream space 82.

In the modification of FIG. 5, the porous base material supply roller 21 and the porous base material collection roller 24 are collectively disposed in the upstream space 81 lying on one of the sides of the suction roller 10. This allows the maintenance space 80 to be ensured in the downstream space 82 lying on the opposite side of the suction roller 10. Also, the arrangement of the rollers 21 and 24 and the maintenance space 80 in the spaces on the opposite sides from each other lowers the height dimension of the manufacturing apparatus 1a, as compared with the arrangement of all of the rollers 21 and 24 and the maintenance space 80 in one of the spaces.

In the aforementioned preferred embodiment, it has been described that the second electrode layer 9b is formed on the second surface of the electrolyte membrane 92 having the first surface with the first electrode layer 9a previously formed thereon. However, the manufacturing apparatus according to the present invention may be configured to form an electrode layer on an electrolyte membrane having first and second surfaces with no electrode layers formed thereon.

In the aforementioned preferred embodiment, it has been described that the laminated base material 94 comprised of the two layers of the electrolyte membrane 92 and the first support film 93 is supplied from the laminated base material supply roller 31 serving as the electrolyte membrane supply roller. However, the electrolyte membrane supply roller according to the present invention may be configured to unwind the electrolyte membrane 92 to which the first support film 93 is not affixed.

In the aforementioned preferred embodiment, it has been described that the electrolyte membrane 92 with the second support film 96 is wound on the assembly collection roller 65 serving as the electrolyte membrane collection roller. However, the electrolyte membrane collection roller according to the present invention may be configured to wind thereon the electrolyte membrane 92 to which the second support film 96 is not affixed.

The configuration of the details of the manufacturing apparatus may differ from that shown in the figures of the present invention. The components described in the aforementioned preferred embodiment and in the modifications may be combined together, as appropriate, without inconsistencies.

While the invention has been described in detail, the foregoing description is in all aspects illustrative and not restrictive. It is understood that numerous other modifications and variations can be devised without departing from the scope of the invention.

What is claimed is:

1. An apparatus for manufacturing a membrane electrode assembly, said apparatus forming an electrode layer on a surface of an elongated strip-shaped electrolyte membrane while transporting said electrolyte membrane, said apparatus comprising:
    a suction roller having an outer peripheral surface and rotating while developing a negative pressure on the outer peripheral surface thereof;
    a porous base material supply roller for unwinding an elongated strip-shaped porous base material therefrom;
    a plurality of porous base material carrying-in rollers for transporting said porous base material from said porous base material supply roller to the outer peripheral surface of said suction roller;
    a porous base material collection roller for winding thereon said porous base material;
    a plurality of porous base material carrying-out rollers for transporting said porous base material from the outer peripheral surface of said suction roller to said porous base material collection roller;
    an electrolyte membrane supply roller for unwinding a laminated base material comprised of at least two layers of said electrolyte membrane and a first support film therefrom toward a surface of the porous base material held on the outer peripheral surface of said suction roller;
    a separation roller disposed adjacent to said suction roller and downstream from a position where said porous base material is introduced onto said suction roller by said plurality of porous base material carrying-in rollers as seen in the direction of rotation of said suction roller;
    a laminating roller disposed adjacent to said suction roller and upstream from a position where said porous base material is separated from said suction roller by said plurality of porous base material carrying-out rollers as seen in the direction of rotation of said suction roller;
    a second support film supply roller for unwinding a second support film toward between said suction roller and said laminating roller;
    an electrolyte membrane collection roller for winding thereon said electrolyte membrane separated from the surface of said porous base material;
    an application part for applying an electrode material onto the surface of said electrolyte membrane around said suction roller; and
    a maintenance space in which a platform is configured and arranged for an operator cleaning parts constituting said application part,
    said electrolyte membrane supplied from said electrolyte membrane supply roller is suctioned onto the surface of said porous base material held on the outer peripheral surface of said suction roller by being introduced to between said suction roller and said separation roller,
    said first support film supplied from said electrolyte membrane supply roller is separated from said electrolyte membrane by passing between said suction roller and said separation roller and then being transported away from said suction roller,
    said second support film is affixed to said electrolyte membrane by being introduced to between said porous base material and said electrolyte membrane held on the outer peripheral surface of said suction roller and said laminating roller,
    said electrolyte membrane and said second support film having passed between said suction roller and said laminating roller are separated from said porous base material by being transported away from said suction roller,
    said porous base material supply roller and said porous base material collection roller are disposed on the opposite side of said suction roller from said maintenance space as seen in a horizontal direction,
    said electrolyte membrane supply roller and said maintenance space are disposed on one side of said suction roller as seen in the horizontal direction, and
    said porous base material supply roller, said porous base material collection roller and said electrolyte membrane collection roller are disposed on the other side of said suction roller as seen in the horizontal direction.

2. The apparatus according to claim 1,
    wherein said electrolyte membrane supply roller unwinds an electrolyte membrane having a first surface with an electrode layer formed thereon,
    said apparatus further comprising
    a plurality of carrying-in rollers for guiding said electrolyte membrane between said electrolyte membrane supply roller and said suction roller,
    wherein the number of carrying-in rollers disposed on the first surface side of said electrolyte membrane of all the carrying-in rollers is less than the number of carrying-in rollers disposed on a second surface side of said electrolyte membrane.

3. The apparatus according to claim 1, wherein
    said maintenance space is positioned between said electrolyte membrane supply roller and said suction roller, and
    said electrolyte membrane unwound from said electrolyte membrane supply roller passes under said maintenance space.

4. The apparatus according to claim 1, wherein
    said porous base material supply roller and said porous base material collection roller are disposed adjacent to each other at the same height.

5. The apparatus according to claim 1, further comprising
    a first support film collection roller for winding thereon said first support film separated from said electrolyte membrane at a position upstream from said suction roller,
    wherein said electrolyte membrane supply roller and said first support film collection roller are disposed on the same side of said suction roller as seen in the horizontal direction.

6. The apparatus according to claim 5, wherein
said electrolyte membrane supply roller and said first support film collection roller are disposed adjacent to each other at the same height.

7. The apparatus according to claim 5, wherein
said maintenance space is positioned between said electrolyte membrane supply roller and said suction roller, and
said laminated base material unwound from said electrolyte membrane supply roller and said separated first support film pass under said platform.

8. The apparatus according to claim 1,
wherein said electrolyte membrane collection roller and said second support film supply roller are disposed on the same side of said suction roller as seen in the horizontal direction.

9. The apparatus according to claim 8, wherein
said electrolyte membrane collection roller and said second support film supply roller are disposed adjacent to each other at the same height.

10. The apparatus according to claim 1, wherein
said electrolyte membrane supply roller and said electrolyte membrane collection roller are disposed at the same height.

11. The apparatus according to claim 1, wherein
said porous base material supply roller, said porous base material collection roller, said electrolyte membrane supply roller and said electrolyte membrane collection roller are disposed below said suction roller.

\* \* \* \* \*